Figure 1:
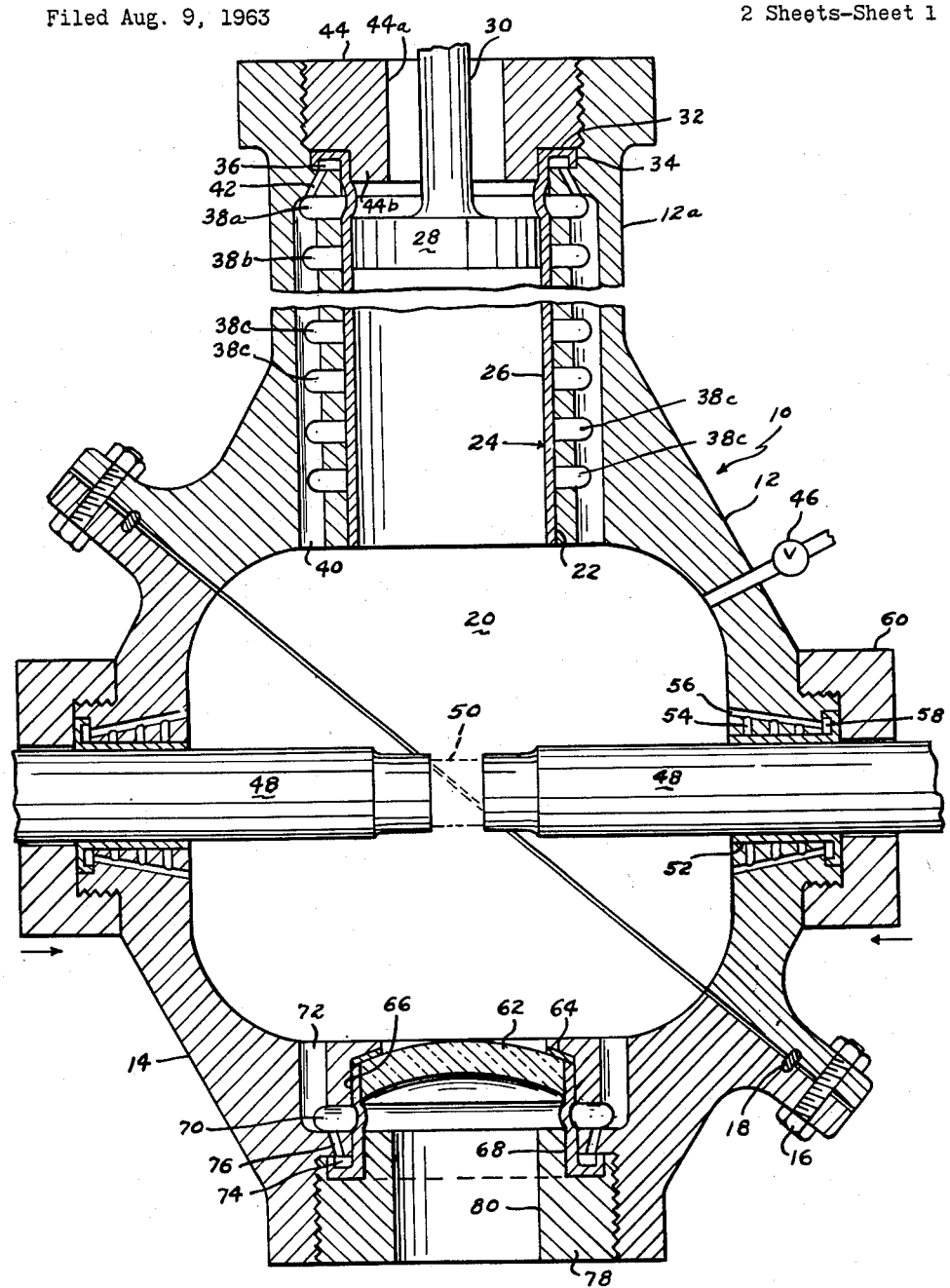

July 14, 1964 G. L. CAMPBELL 3,140,514
SUPER PRESSURE GENERATING CHAMBER WITH FLEXIBLE SLEEVE SEAL
Filed Aug. 9, 1963 2 Sheets-Sheet 1

INVENTOR.
GABE L. CAMPBELL
BY
ATTORNEYS

July 14, 1964 G. L. CAMPBELL 3,140,514
SUPER PRESSURE GENERATING CHAMBER WITH FLEXIBLE SLEEVE SEAL
Filed Aug. 9, 1963 2 Sheets-Sheet 2

INVENTOR.
GABE L. CAMPBELL
BY
ATTORNEYS

United States Patent Office 3,140,514
Patented July 14, 1964

3,140,514
SUPER PRESSURE GENERATING CHAMBER WITH FLEXIBLE SLEEVE SEAL
Gabe L. Campbell, 1155 Shawnee Drive, Wayne Lakes Park, Greenville, Ohio
Filed Aug. 9, 1963, Ser. No. 301,217
9 Claims. (Cl. 18—16)
(Granted under Title 35, U.S. Code (1952), sec. 266)

The invention described herein may be manufactured and used by or for the Government for governmental purposes without the payment to me of any royalty thereon.

This invention relates to gas or pneumatic pressure chambers, and more specifically, to such chambers used for the generation of pressures beyond the range of conventional compressing machines. This invention further relates to super pressure generating chambers having flexible seals for preventing the escape of contained gas under super pressure.

At the present time, great advances are being made in all the arts and sciences. Researchers and scientists are probing deeper and deeper in every field; and in so doing, require more complex apparatus than ever before. Much research is being conducted in environments having pressure and temperature extremes which were practically unattainable until recent years. Much of the current work relates to basic studies of metals and other materials in such extreme environments.

It is well known that the generation of extremely high pressures in a gas is very difficult. Not only are conventional compressors unsuitable beyond a relatively low pressure, but other expedients, such as explosives, are likewise not satisfactory.

Super pressure gases are also required for much basic research in such areas as combustion studies. Likewise, chambers adapted for such extreme pressures are useful in the study of new forming techniques. For example, in connection with space vehicles, certain easily oxidizable metals such as beryllium, molybdenum, and tantalum have certain desirable characteristics but also have other characteristics which make them hard to form and anneal in atmospheric environments.

One object of the present invention is to provide a chamber for the generation of super pressures.

Another object of this invention is to provide a super pressure chamber having flexible metallic sleeve seals forming the cylinders for receiving axially movable elements.

Yet another object of this invention is to provide a super pressure chamber having metallic sleeve seals which receive axially movable elements, and which under the high internal pressure within the chamber, will flex against the axially movable elements to prevent leakage.

A further object of this invention is to provide for use on an extremely high pressure gas apparatus, a flexible sleeve seal whose sealing grip increases with an increase in the pressure of the gas within the apparatus.

A still further object of this invention is to provide a super pressure generating chamber adapted for use on a press in the forming of intricate metal shapes in dies and the like.

Figure 2:
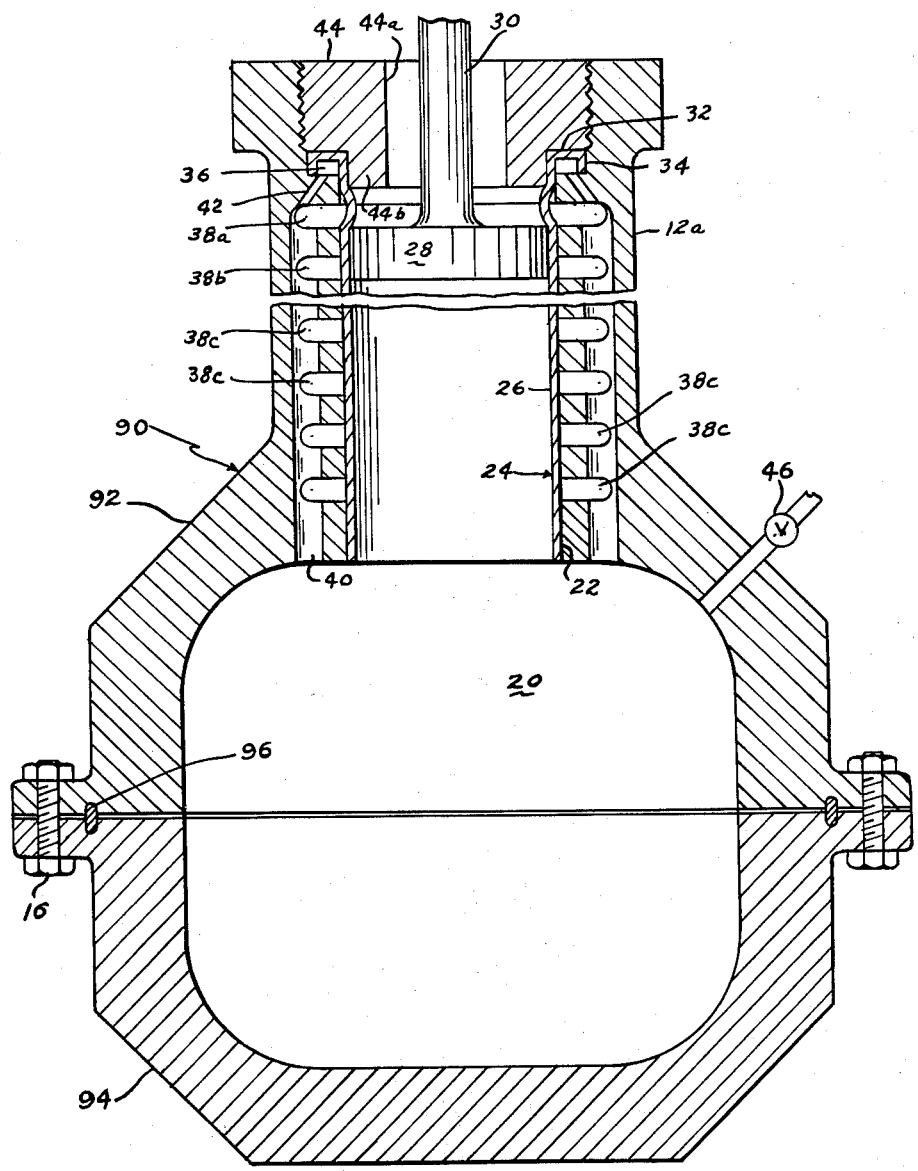

Additional objects, advantages and features of the invention reside in the construction, arrangement and combination of parts involved in the embodiment of the invention as will appear from the following description and accompanying drawings wherein:

FIG. 1 is a cross section of a super pressure generating chamber such as would be used in conjunction with a press; and having an observation window, and FIG. 2 is a cross section of a super pressure generating chamber such as would be used where the only requirement is to generate a super pressure on a contained gas.

Referring to FIG. 1, the super pressure generating chamber 10, which will be hereinafter referred to as chamber 10, has a separable body having a first flanged body member 12 and a second flanged body member 14. The two flanged body members are separably joined or held together by a plurality of bolts 16 passing through the flanges. The body members are tightly drawn against an elliptical metallic O-ring 18 partially nested in the face of each flange as shown. Metallic O-rings, such as shown, are well known, and are used to provide seals on high pressure apparatus. The body formed by the two body members contains a cavity or chamber 20 in which the gas is compressed.

The first body member 12 has an integral protruding cylinder housing 12a, having an axial bore 22 communicating with cavity 20 for axially receiving the cylinder portion of flexible sleeve seal 24. The sleeve seal 24, which is a thin wall structure, contains a highly polished cylinder 26 for slidably receiving piston 28 which has a rearward extending piston rod 30. Any suitable actuating means not constituting a portion of this invention, such as a hydraulic or pneumatic cylinder joined to piston rod 30, may be used to move piston 28 forward in cylinder 26 of seal 24 to reduce the volume of the cavity within the body and thereby raise the pressure of the contained gas. While only one cylinder and piston are shown, it is understood that a plurality of such cylinders may be used within the context of this disclosure. The number of compression cylinders and pistons to be used is a design criterion dependent upon such factors as initial volume of the cavity including that portion of the cylinder ahead of the piston, and the required reduction in volume to attain the required super pressure.

The outer end of sleeve seal 24 terminates in a circular flange 32 at substantially right angle to the axis of the cylinder 26, and a turned back lip 34 on the perimeter of the flange. The circular flange 32 and lip 34 nest in a counterbore in cylinder housing 12a with the free edge of lip 34 engaging the bottom face of the counterbore. The lip is of sufficient width to form an annular chamber 36 at the underneath side of flange 32 when the lip engages the bottom of the counterbore. The flange and lip are of substantially the same metal thickness as the cylinder portion of the sleeve seal, and like the cylinder, can be flexed under the influence of high pressure gas contained within the chamber 20.

Axially spaced and radially extending from the bore 22 in cylinder housing 12a are a plurality of grooves 38. The grooves have been designated on the drawings as 38a, 38b and 38c in order that specific grooves may more easily be referred to hereinafter. As shown on FIG. 1, circular groove 38a is rearward from the rear face of the piston, groove 38b is adjacent to the periphery of the piston, and all other grooves designated as 38c are in front of the forward face of the piston. Parallel to bore 22 and radially located to intersect with the bottom of circular grooves 38 is one or more drilled passages 40 which are open to cavity 20 in the body. The outermost of the circular grooves 38a communicates with the annular chamber 36 formed on the underneath side of the flange on the flexible sleeve seal 24 through one or more passages 42. Passage 42 may extend from the bottom face of the counterbore to groove 38a as shown, or may extend into passage 40, or may be an independent passage (not shown) between the face of the counterbore and cavity 20 in the body; the only important requirement being that the bottom face of the counterbore be in communication with the cavity in the body.

The flexible sleeve seal 24 is retained by means of an externally threaded retainer plug 44 which engages the internally like-threaded counterbore in the end of cylinder housing 12a. The retainer plug 44 contains a bore 44a for the passage of piston rod 30, and on the inner end has a reduced diameter supporting boss 44b which slidably engages and "backs up" the outer end of the flexible sleeve seal.

A valve 46 is joined to one of the body members to communicate with cavity 20. The valve may be used as a charging valve to charge the cavity with a suitable gas and also as a bleed valve through which high pressure compressed gas may be drawn.

FIG. 1 depicts the chamber 10 charged with high pressure gas and with the piston 28 moved forward from its initial position against the face of the inner retainer plug; so as to be adjacent to circular groove 38b. The cylinder 26 of the flexible sleeve seal 24 is shown to be flexed in the region adjacent to circular groove 38a between supporting boss 44b and the rear face of the piston. The degree of flexure is shown in exaggerated form for clarity. When the chamber 10 is not charged, the flexible seal is unflexed, and forms a straight cylinder offering no resistance to the axial movement of the piston.

In operation, the piston 28 is withdrawn to its outermost position; after which the cavity and cylinder ahead of the piston are charged through valve 46. Since the contained gas can be compressed only by the amount of the volumetric displacement of the piston moving in the cylinder, the higher the pressure of the initial charge, the higher will be the final presure after compression. The pressure of the contained gas acts on the periphery of the cylinder 26 through drilled passage 40 and circular grooves 38. It is evident that there is a zero pressure differential across that portion of the cylinder ahead of the piston, and that portion of the sleeve is not flexed or deformed. The pressure of the contained gas also holds the circular flange 32 and lip 34 tightly against all mating surfaces by acting against the flange and lip through annular chamber 36 and passage 42. When the piston is advanced to the position shown on FIG. 1, the circular groove 38a will be behind the piston, circular groove 38b will be adjacent to the periphery of the piston, and all other grooves 38c will remain ahead of the piston. Since the piston rod side of the piston is at ambient pressure, an extreme pressure differential is created across the wall of that portion of the cylinder behind the piston, and the wall will flex inwardly due to this pressure differential. The pressure acting against the periphery of the piston through circular groove 38b will be somewhat less than the maximum pressure differential at circular groove 38a, and, together with the flexure of the cylinder behind the piston, will squeeze the cylinder 26 firmly against the piston to restrict leakage and prevent escape of the gas within the chamber. It is thus seen that as the piston advances farther and farther to compress the contained gas, the pressure differential increases and the sealing action of the cylinder against the periphery of the piston is likewise increased. The same increase in pressure differential also applies to the circular flange 32 and lip 34; and the circular flange and lip are held tighter and tighter against their mating surfaces. It is thus seen that the present seal uses a metal to metal contact surface which becomes more firmly engaged with each increase in the pressure of the contained compressed gas. The piston may be advanced to the end of its stroke; however, it cannot be withdrawn until the gas is bled from the chamber to return the flexed portion of the cylinder behind the piston to its free-state configuration.

The embodiment of the invention shown on FIG. 1 is primarily intended for making studies and research of materials, and for forming intricate parts under compression in a super pressure environment. Again referring to FIG. 1, the chamber 10 has two opposing coaxial plunger rods 48, the internal ends of which are used to apply compression to the work piece 50 placed between the ends. The work piece 50 is shown by dotted lines to be symbolic of any substance of material, or of a forming die. The plunger rods are each journaled in a flexible sleeve seal 52 such as flexible sleeve seal 24 which was previously described in detail. Axially spaced and surrounding each sleeve seal 52 are one or more circular grooves 54 and one or more drilled passages 56 connecting the circular grooves 54 and the annular chamber 58 formed by the circular flange of the flexible sleeve seal 52. Each sleeve seal is held in place by an internally threaded retaining means such as nut 60 engaging an externally threaded boss on body members 12 and 14. The operation of each flexible sleeve seal 52 is similar to the operation of seal 24, in that the high pressure gas acting through passage 56 and circular grooves 54 flexes the seal against the plunger rod 48 with a metal to metal squeezing contact.

Chamber 10 is further provided with a transparent observation member such as lens 62. Lens 62, which is preferably a convex-concave lens, is installed in one of the body members with the convex face inward to better resist the gas pressure. The lens nests against a sealing member such as gasket 64 adjacent to the bottom of counterbored opening 66. The periphery of the lens is surrounded by a flexible sleeve seal 68 similar to flexible sleeve seal 24 previously described in detail. Coaxial with and radially extending from the wall of the counterbored opening 66 is a circular groove 70. Parallel to the wall of the counterbored opening and radially located to intersect with the circular groove 70 is one or more drilled passage 72 which is open to cavity 20. The circular groove 70 communicates with the annular chamber 74 formed by the flange and lip of the flexible sleeve seal 68 through one or more passages 76. The flexible sleeve seal 68 is retained by means of an externally threaded retainer or end plug 78 which engages internal threads in the body member as shown. The end plug 78 contains a bore 80 forming an eye piece through which an observer may look at work piece 50 within the chamber.

The flexible sleeve seal 68 functions very much like flexible sleeve seal 24 which was previously described in detail. The high pressure gas, acting through passage 72 and circular groove 70, flexes the cylinder portion of the seal behind the lens and holds the lens firmly in place against the gasket.

FIG. 2 depicts a second and simplified embodiment of the invention which is intended only for the generation of super pressures. The flexible sleeve seal and piston are identical with the flexible sleeve seal and piston of FIG. 1; therefore, like elements on both figures have like numbers. The chamber 90, which may be greatly simplified over chamber 10 because only one opening requires machining operations from the inside, comprises a first body member 92 and a second body member 94 drawn together against an elliptical metallic O-ring 96 by a plurality of bolts 16.

The chambers disclosed may be provided with means for heating or cooling. Such means, which do not constitute a part of this invention, are well known to the art and are therefore not shown.

It is to be understood that the embodiments of the present invention as shown and described are to be regarded as illustrative only and that the invention is susceptible to variations, modifications and changes within the scope of the appended claims.

I claim:

1. A super pressure generating chamber comprising a body having a first body member and a second body member severably joined to the first body member to provide a chamber having a cavity adapted to contain a compressed gas under high pressure; one or more elongated cylinder housings outwardly extending from at least one of said body members, each of said cylinder housings containing an axial bore having a counterbore at the outer end and communicating at the inner end with the cavity in said body, a plurality of grooves axially spaced and radiating outwardly from said axial bore, one or more passages connecting said grooves to the cavity in said body, and one or more passages between the bottom face of said counterbore and the cavity in said body; a flexible sleeve seal for each of said cylinder housings, each flexible sleeve seal having an elongated cylinder the outer periphery of which is in engagement with the axial bore in said cylinder housing and having at the outer end of said cylinder a circular flange having a turned back edge nested against the bottom face of the counterbore in said cylinder housing to provide an annular chamber on the underneath side of said flange in communication with said passages between the bottom face of the counterbore in said cylinder housing and the cavity in said body; a piston for each of said cylinder housings, each of said pistons being axially movable in the cylinder of said flexible sleeve seal and having a rearward extending piston rod; and retaining means for each of said flexible sleeve seals, each of said retaining means having a bore for the passage of the piston rod on said piston and being removably joined to said cylinder housing to axially retain the circular flange of said flexible sleeve seal, and further having a supporting boss internally engaging the outer end of the cylinder on said flexible sleeve seal; said piston when axially moving forward in the cylinder of said flexible sleeve seal compressing the gas contained ahead of the forward face of said piston and the cavity within said body, the pressure of the compressed gas within the grooves and passages in said cylinder housing acting to flex inwardly that portion of the cylinder of said flexible sleeve seal between the supporting boss on said retaining means and the rear face of said piston to thereby bring that portion of the cylinder of said flexible sleeve seal which is adjacent to the periphery of said piston into squeezing engagement, and further, acting through the annular chamber on the underneath side of the circular flange at the outer end of said flexible sleeve seal, to flex the circular flange tightly against the mating surfaces on said cylinder housing and said retaining means to thereby restrict leakage and escape of the compressed gas within the chamber.

2. A super pressure generating chamber in accordance with claim 1 in which each of said flexible sleeve seals has an elongated cylinder the outer periphery of which is in engagement with the axial bore in said cylinder housing, and further having at the outer end of said cylinder a circular flange normal to the axis of the cylinder and having a lip on the perimeter of the flange coaxial with the cylinder and nesting in the counterbore in said cylinder housing with the free end of the lip against the bottom face of the counterbore in said cylinder housing to provide an annular chamber on the underneath side of said flange in communication with said passages between the bottom face of the counterbore in said cylinder housing and the cavity in said body.

3. A super pressure generating chamber comprising a body having a first body member and a second body member severably joined to the first body member to provide a chamber having a cavity adapted to contain a compressed gas under high pressure, said body having in opposing walls two coaxial bores each having a counterbore at the outer end and communicating at the inner end with the cavity in said body, one or more grooves axially spaced and radiating outwardly from each of said coaxial bores, one or more passages connecting said grooves to the cavity in said body, and one or more passages between the bottom face of each counterbore and the cavity in said body; one or more elongated cylinder housings outwardly extending from at least one of said body members, each of said cylinder housings containing an axial bore having a counterbore at the outer end and communicating at the inner end with the cavity in said body, a plurality of grooves axially spaced and radiating outwardly from said axial bore, one or more passages connecting said grooves to the cavity in said body, and one or more passages between the bottom face of said counterbore and the cavity in said body; a flexible sleeve seal in each of said coaxial and said axial bores, each flexible sleeve seal having an elongated cylinder the outer periphery of which is in engagement with one of said bores and having at the outer end of each cylinder a circular flange having a turned back edge nested against the bottom face of the counterbore at the outer end of said bores to provide an annular chamber on the underneath side of each flange in communication with said passages between the bottom face of the counterbores at the outer end of said bores and the cavity in said body; a piston for each of said cylinder housings, each of said pistons being axially movable in the cylinder of the said flexible sleeve seal in said cylinder housing and having a rearward extending piston rod; a plunger rod axially movable in the cylinder of each of said flexible sleeve seals in the coaxial bores of said body; a first retaining means for each of said flexible sleeve seals in said cylinder housings, each of said retaining means having a bore for the passage of the piston rod on said piston and being removably joined to said cylinder housing to axially retain the circular flange of said flexible sleeve seal, and further having a supporting boss internally engaging the outer end of the cylinder on said flexible sleeve seal; and a second retaining means for each of said flexible sleeve seals in the coaxial bores of said body, each of said retaining means having a bore for the passage of said plunger rod and being removably joined to said body to axially retain the circular flange of said flexible sleeve seal; said piston when axially moving forward in the cylinder of said flexible sleeve seal in said cylinder housing compressing the gas contained ahead of the forward face of said piston and the cavity within said body, the pressure of the compressed gas within the grooves and the passages in said cylinder housing acting to flex inwardly that portion of the cylinder of said flexible sleeve seal between the supporting boss on said first retaining means and the rear face of said piston to thereby bring that portion of the cylinder of said flexible sleeve seal which is adjacent to the periphery of said piston into squeezing engagement with said piston, and acting within the grooves and the passages in said body to flex inwardly the cylinders of the flexible sleeve seals in the coaxial bores of said body into squeezing engagement with said plunger rods, and further acting through the annular chamber on the underneath side of the circular flange at the outer end on each of said flexible sleeve seals, to flex the circular flanges tightly against their mating surfaces on said body, said cylinder housing and said retaining means to thereby restrict leakage and escape of the compressed gas within the chamber.

4. A super pressure generating chamber in accordance with claim 3 in which each of said flexible sleeve seals in each of said coaxial and said axial bores has an elongated cylinder the outer periphery of which is in engagement with one of said bores, and further having at the outer end of said cylinder a circular flange normal to the axis of the cylinder and having a lip on the perimeter of the flange coaxial with the cylinder and nesting in the counterbore at the outer end of each of said bores with the free end of the lip against the bottom face of the counterbore to provide an annular chamber on the underneath side of said flange in communication with said passages between the bottom face of each counterbore and the cavity in said body.

5. In combination with a body member of a high pressure apparatus having a cavity containing a compressed gas under high pressure, a flexible sleeve seal adapted to engage with and squeeze the periphery of an axially movable member operable within said flexible sleeve seal to thereby restrict leakage and escape of the high pressure gas contained in the apparatus, said combination comprising: an axial bore within said body member, said bore having a counterbore at the outer end and communicating at the inner end with the cavity in said apparatus, one or more grooves axially spaced and radiating outwardly from said axial bore, one or more passages connecting said grooves to the cavity in said apparatus, and one or more passages between the bottom of said counterbore and the cavity in said apparatus; a flexible sleeve seal having an elongated cylinder receiving said axially movable member, the outer periphery of said cylinder being in engagement with the axial bore in said body member, and having at the outer end of said cylinder a circular flange having a turned back edge nested against the bottom face of said counterbore in said body member to provide an annular chamber on the underneath side of said flange in communication with said passages between the bottom face of said counterbore and the cavity of said apparatus; and retaining means removably joined to said body member and axially retaining the circular flange of said flexible sleeve seal; the pressure of the compressed gas within said grooves and said passages in said body member acting to flex inwardly the cylinder of said flexible sleeve seal to squeeze said axially movable member, and further, acting through the annular chamber on the underneath side of the circular flange at the outer end of said flexible sleeve seal, to flex the circular flange tightly against the mating surfaces on said body member and said retaining means to thereby restrict leakage and escape of the compressed gas within the apparatus.

6. In combination, a flexible sleeve seal in accordance with claim 5 in which said flexible seal has an elongated cylinder receiving said axially movable member, the outer periphery of said cylinder being in engagement with the axial bore in said body member and having at the outer end a circular flange normal to the cylinder and having on the perimeter of the flange a lip coaxial with the cylinder and nesting in the counterbore of said body member with the free end of the lip against the bottom face of the counterbore in said body member to provide an annular chamber communicating with the passages between the bottom face of the counterbore in said body member and the cavity of said apparatus.

7. In combination with a body member of a high pressure apparatus having a cavity containing a compressed gas under high pressure, a flexible sleeve seal adapted to engage with and squeeze the periphery of an axially movable piston operable within said flexible sleeve seal to thereby restrict leakage and escape of the high pressure gas contained in the apparatus, said combination comprising: an axial bore within said body member, said bore having a counterbore at the outer end and communicating at the inner end with the cavity in said apparatus, a plurality of grooves axially spaced and radiating outwardly from said axial bore, one or more passages connecting said grooves to the cavity in said apparatus, and one or more passages between the bottom of said counterbore and the cavity in said apparatus; a flexible sleeve seal having an elongated cylinder receiving said piston, the outer periphery of said cylinder being in engagement with the axial bore in said body member, and having at the outer end of said cylinder a circular flange having a turned back edge nested against the bottom face of said counterbore in said body member to provide an annular chamber on the underneath side of said flange in communication with said passages between the bottom face of said counterbore and the cavity of said apparatus; and retaining means removably joined to said body member and axially retaining the circular flange of said flexible sleeve seal; the pressure of the compressed gas within said grooves and said passages in said body member acting to flex inwardly that portion of the cylinder of said flexible sleeve seal rearward from the rear face of said piston to thereby bring that portion of the cylinder adjacent to the periphery of said piston into squeezing engagement, and further, acting through the annular chamber on the underneath side of the circular flange at the outer end of said flexible sleeve seal, to flex the circular flange tightly against the mating surfaces on said body member and said retaining means to thereby restrict leakage and escape of the confined gas within said apparatus.

8. In combination with a body member of a high pressure apparatus having a cavity containing a compressed gas under high pressure, a flexible sleeve seal adapted to engage with and squeeze the periphery of an axially movable piston having a rearward extending piston rod operable within said flexible sleeve seal to thereby restrict leakage and escape of the high pressure gas contained in the apparatus, said combination comprising: an axial bore within said body member, said bore having a counterbore at the outer end and communicating at the inner end with the cavity in said apparatus, a plurality of grooves axially spaced and radiating outwardly from said axial bore, one or more passages connecting said grooves to the cavity in said apparatus, and one or more passages between the bottom of said counterbore and the cavity in said apparatus; a flexible sleeve seal having an elongated cylinder receiving said piston, the outer periphery of said cylinder being in engagement with the axial bore in said body member, and having at the outer end of said cylinder a circular flange having a turned back edge nested against the bottom face of said counterbore in said body member to provide an annular chamber on the underneath side of said flange in communication with said passages between the bottom face of said counterbore and the cavity of said apparatus; and retaining means having a bore for the passage of the piston rod on said piston and removably joined to said body member to axially retain the circular flange of said flexible sleeve seal, and further having a supporting boss internally engaging the outer end of the cylinder on said flexible sleeve seal; the pressure of the compressed gas within said grooves and said passages in said body member acting to flex inwardly that portion of the cylinder of said flexible sleeve seal between the supporting boss on said retaining means and the rear face of said piston to thereby bring that portion of the cylinder adjacent to the periphery of said piston into squeezing engagement, and further, acting through the annular chamber on the underneath side of the circular flange at the outer end of said flexible sleeve seal, to flex the circular flange tightly against the mating surfaces on said body member and said retaining means to thereby restrict leakage and escape of the confined gas within said apparatus.

9. In combination, a flexible sleeve seal in accordance with claim 8 in which said flexible sleeve seal has an elongated cylinder receiving said axially movable piston, the outer periphery of said cylinder being in engagement with the axial bore in said body member and having at the outer end a circular flange normal to the axis of the cylinder and having on the perimeter of the flange a lip coaxial with the cylinder and nesting in the counterbore of said body member with the free end of the lip against the bottom face of the counterbore in said body member to provide an annular chamber communicating with the passages between the bottom face of the counterbore in said body member and the cavity of said apparatus.

References Cited in the file of this patent

UNITED STATES PATENTS

| | | |
|---|---|---|
| 1,896,062 | Berry | Feb. 7, 1933 |
| 2,610,651 | Hahn | Sept. 16, 1952 |
| 3,093,862 | Gerard et al. | June 18, 1963 |
| 3,118,177 | Von Platen | Jan. 21, 1964 |